UNITED STATES PATENT OFFICE.

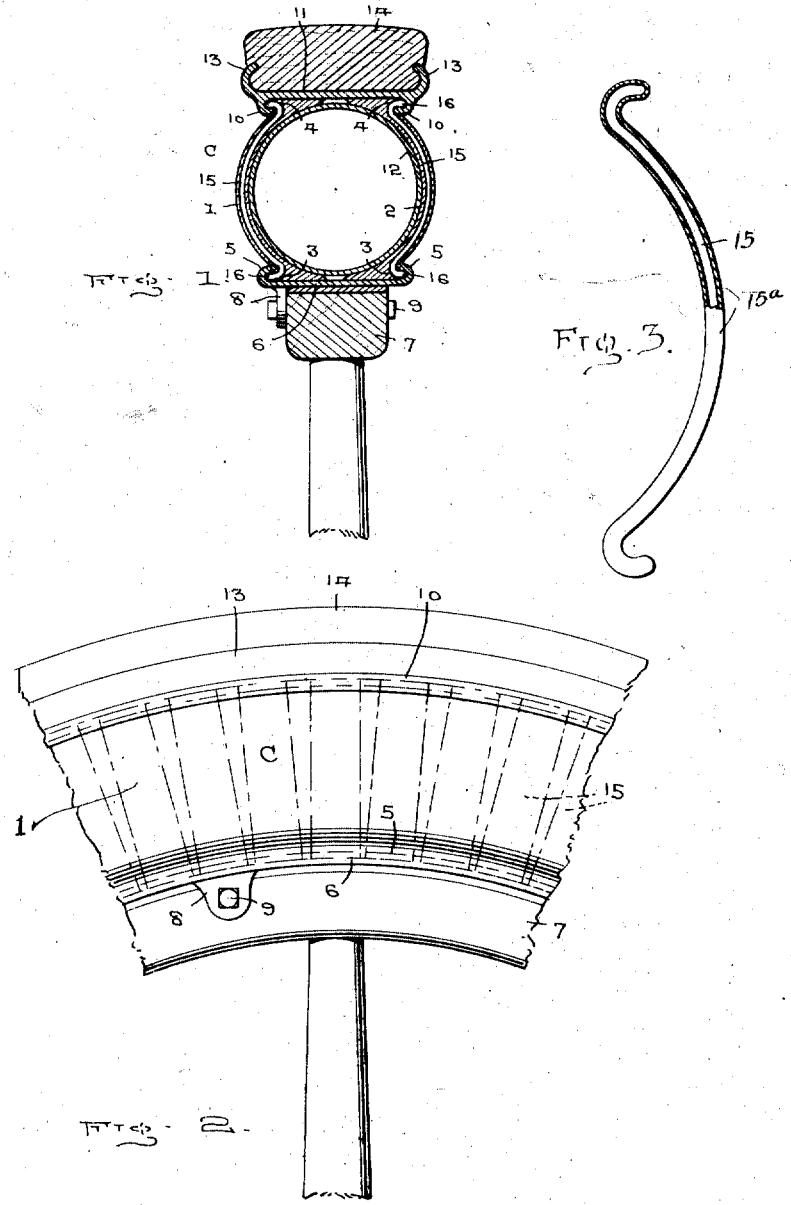

WILLIAM D. SEAL, OF PIEDMONT, MISSOURI.

RESILIENT TIRE AND WHEELS.

1,225,183.  Specification of Letters Patent.  Patented May 8, 1917.

Application filed November 16, 1916. Serial No. 131,732.

*To all whom it may concern:*

Be it known that I, WILLIAM D. SEAL, a citizen of the United States, residing at Piedmont, in the county of Wayne and State of Missouri, have invented certain new and useful Improvements in Resilient Tires and Wheels; and I do hereby declare the following to be a full, clear, and exact description of the invention, such as will enable others skilled in the art to which it appertains to make and use the same.

This invention relates to the class of resilient tires and wheels, and more particularly to a pneumatic tire.

The principal object of the invention is the provision of a pneumatic tire embodying a casing consisting of two sections substantially semicircular in cross section and adapted to be positioned upon a wheel rim, a tread rim detachably mounted circumferentially of the casing and serving to hold the outer edges of the casing sections together, and a solid tire mounted upon the tread rim.

Another object of the invention is the provision of casing sections of the above stated character, each of which has a plurality of resilient reinforcing stays embedded therein and formed at their opposite ends with hooks designed to project outwardly and into the inner and outer circumferential beads of each section, whereby when the sections are positioned upon the wheel rim and engaged with the tread rim, they will be more firmly and securely held in position when the inner tube positioned between the sections has been inflated to the desired pressure.

With these and other objects in view as will appear as the description proceeds, the invention comprises the various novel features of construction, combination and arrangement of parts as will be more fully described hereinafter and set forth with particularity in the appended claim.

Referring to the drawings,

Figure 1 is a vertical transverse sectional view of my improved pneumatic tire, and Fig. 2 is a fragmentary side elevation thereof.

Fig. 3 is a sectional elevation of one of the reinforcing stays showing the covering therefor.

Similar characters of reference are used to denote like parts throughout the accompanying drawings and in the following specification.

Referring more particularly to the drawings, my improved pneumatic tire is shown to consist of a casing "C" that embodies sections 1 and 2 which are substantially semicircular in cross section. Each of these casing sections 1 and 2 respectively is provided with inner and outer circumferentially extending beads 3 and 4 respectively, the inner beads 3 being designed to engage beneath the outwardly and circumferentially extending flanges 5 of the wheel rim 6, which latter is detachably mounted upon the wheel felly 7 through the medium of suitable fastening lugs 8 that are securely attached to the felly by bolts 9 passing therethrough.

While I have shown the sections 1 and 2 mounted upon a clencher rim, I desire to have it understood that my improved tire may be used upon any quick detachable rim or any other standard make of rim.

The outer circumferential beads 4 of each of the sections 1 and 2 are designed to be engaged with the inwardly and circumferentially extending flanges 10 of a tread rim 11 mounted circumferentially of the casing sections. Positioned within or between the casing sections 1 and 2 is the usual form of inner tube 12, and when it has been inflated to the desired number of pounds of pressure, the flanges 10 will securely and effectively hold the outer circumferential edges of the casing sections together, and prevent any accidental spreading or disengagement of the sections from the tread rim and the wheel rim.

The tread rim 11 is further provided with outwardly and circumferentially extending flanges 13, between which and the tread rim 11 is positioned a solid tire 14, these flanges 13 serving to effectively hold and retain the tire in position upon the tread rim. It is to be understood that any form of solid rubber tire may be used, or if desired any kind of a fabricated rubber or other material may be used.

While I have shown the flanges 13 formed integral with the tread rim 11, I desire to have it understood that if desirable, one of these flanges 13 may be dispensed with and a detachable ring and rim flange substituted therefor, whereby the solid tire 14 may be slid laterally into position upon the tread rim, after which the detachable flange and ring may be secured in position upon the side edge of the tread rim to effectively and securely hold the tire in position.

In order to increase the practicability and the durableness of my improved tire, I embed within each of the casing sections 1 and 2 a plurality of spaced radially extending resilient reinforcing stays 15, the opposite ends of which are formed with laterally extending hooks 16 that project into each of the inner and outer circumferential beads 3 and 4. As clearly shown in Fig 1 of the drawings, these hooks are designed to engage the flanges 5 and 10 of the wheel flange and the tread rim so as to securely hold and retain the casing sections 1 and 2 in position upon the wheel rim against the possibility of the tire being detached therefrom during the course of travel over the ground and particularly when traveling around a curve.

It is to be further understood that each of these reinforcing stays 15 is to be covered with a suitable covering of rubber or fabric so as to prevent the stays from injuring the casing sections, as clearly shown in Fig. 3.

What I claim is:—

The combination with a wheel rim, of a pair of casing sections substantially semi-circular in cross section, each of said sections being formed with inner and outer circumferentially extending beads, the inner beads adapted to engage the wheel rim flanges, a tread rim formed with inner and circumferentially extending flanges adapted to engage the outer beads of said casing sections, a solid tire mounted upon the tread rim, a plurality of spaced radially extending resilient reinforcing stays mounted in each of said sections, and hooks formed at the opposite ends of each stay which project laterally into said inner and outer beads, said hooks engaging behind the wheel rim and tread rim flanges to positively prevent accidental disengagement of the casing sections from said rims.

In testimony whereof I have signed my name to this specification in the presence of two subscribing witnesses.

WILLIAM D. SEAL.

Witnesses:
ELI STITH,
J. E. GILMER